(12) United States Patent
Chatterjee et al.

(10) Patent No.: US 8,984,011 B1
(45) Date of Patent: **\*Mar. 17, 2015**

(54) PAGE OBJECT CACHING FOR VARIABLY SIZED ACCESS CONTROL LISTS IN DATA STORAGE SYSTEMS

(71) Applicant: American Megatrends, Inc., Norcross, GA (US)

(72) Inventors: Paresh Chatterjee, Fremont, CA (US); Srikumar Subramanian, Newark, CA (US); Raghavan Sowrirajan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/736,305

(22) Filed: Jan. 8, 2013

Related U.S. Application Data

(63) Continuation of application No. 12/702,942, filed on Feb. 9, 2010, now Pat. No. 8,352,497.

(60) Provisional application No. 61/151,008, filed on Feb. 9, 2009.

(51) Int. Cl.
*G06F 7/02* (2006.01)
*G06F 17/30* (2006.01)
*G06F 21/60* (2013.01)

(52) U.S. Cl.
CPC .......... *G06F 21/60* (2013.01); *G06F 17/30097* (2013.01); *G06F 17/3033* (2013.01); *G06F 17/30312* (2013.01)

USPC .................. 707/785; 707/781; 707/705

(58) Field of Classification Search
CPC ............... G06F 17/30097; G06F 17/30312; G06F 17/3033

See application file for complete search history.

(56) References Cited

U.S. PATENT DOCUMENTS

| 5,974,421 A | 10/1999 | Krishnaswamy et al. |
| 6,032,216 A * | 2/2000 | Schmuck et al. ............. 710/200 |
| 7,506,102 B2 | 3/2009 | Lev-Ran et al. |
| 7,711,788 B2 * | 5/2010 | Lev Ran et al. ............... 709/213 |
| 2002/0026511 A1 | 2/2002 | Garcia-Luna-Aceves et al. |
| 2003/0220985 A1 | 11/2003 | Kawamoto et al. |
| 2007/0239953 A1 | 10/2007 | Savagaonkar et al. |

* cited by examiner

*Primary Examiner* — Bruce Moser
(74) *Attorney, Agent, or Firm* — Meunier Carlin & Curfman, LLC

(57) ABSTRACT

Technologies are described herein for caching variably sized access control lists (ACLs) in a data storage system utilizing page object caching. A request to access a file is received. An inode number of the requested file is identified. A hash key based on the inode number and a predefined hash value is determined. A determination is made as to whether the hash key is contained in a hash list. In response to determining that the hash key is contained in the hash list, access to a page object in the memory is provided. The page object contains an access control list (ACL) associated with the requested file. The ACL is retrieved from the page object.

9 Claims, 9 Drawing Sheets

PAGE OBJECT CACHING FOR VARIABLY SIZED ACCESS CONTROL LISTS IN DATA STORAGE SYSTEMS

CROSS-REFERENCE TO RELATED APPLICATIONS

This application is a continuation of U.S. patent application Ser. No. 12/702,942, filed on Feb. 9, 2010, and entitled "Page Object Caching for Variably Sized Access Control Lists in Data Storage Systems," and claims the benefit of U.S. provisional patent application No. 61/151,008, filed on Feb. 9, 2009, the disclosures of which are expressly incorporated herein by reference in their entireties.

BACKGROUND

Access control lists ("ACLs") may be utilized in conjunction with file storage systems to specify access rights for file system objects, such as files and folders. The access rights may specify whether a given user is allowed to perform certain file operations. The access rights may also specify the extent to which the user is allowed to perform certain file operations. For example, an ACL may specify that a user U1 has read-only access to a file F1 and another user U2 has read-write access to the same file F1. Each file system object may have an associated ACL.

Each ACL may include one or more access control entries ("ACEs"). Each ACE can define the access rights for a particular user or group of users. When a user attempts an operation on a file system object, the file system can check the corresponding ACL to see if the user has the necessary access rights to perform the operation. If the user has the necessary access rights, the file system may permit access to the file system object. If the user does not have the necessary access rights, the file system may deny access to the file system object.

Conventionally, the ACL resides on disk as part of the metadata associated with the file system object. Consider, for example, the following sequence of operations where a user adds a new ACE to an ACL or modifies an existing ACE within the ACL. First, the file system retrieves the ACL from disk in order to check whether the user has permission to retrieve the ACL. If the user does have permission to retrieve the ACL, then the file system retrieves the ACL a second time in order to check whether the user has permission to add a new ACE or modify the existing ACE. If the user does have permission to add a new ACE or modify the existing ACE, the file system adds the new ACE or modifies the existing ACE to disk. Upon writing the ACL to disk, the file system retrieves the ACL a third time in order to display the modified ACL to the user. In this example, the ACL is retrieve three times, and the disk is accessed four times (e.g., three ACL gets and one ACL write).

In order to reduce the number of disk accesses, the file system may cache the ACL in memory. In the above example, caching may reduce the number of ACL gets from three to two. In cases of a recursive ACL operation where the ACLs associated with an entire tree are modified, the number of disk accesses can be reduced to one. This can happen because when the ACL of a given folder is modified, the ACLs of each subfolder and file contained in the folder are also flushed to disk.

Conventional caching solutions suffer are inefficient because ACLs can vary in size. In particular, the size of an ACL may be determined from the number of ACEs contained in the ACL. However, in prevalent caching models, such as those utilized in UNIX/LINUX and other suitable file systems, a cache line is a fixed block or chunk of memory that represents a corresponding on-disk image. As a result, one approach is to set the size of the cache line to correspond to the largest possible ACL. Although this approach ensures that every cache line can store every ACL, this approach wastes memory where the cache lines store ACLs less than the maximum size.

In order to address the drawbacks of the fixed sized cache line, another approach utilizes multiple cache line classes having cache lines of varying sizes. Each cache line class may represent a landmark number of ACEs (e.g., 2, 4, 6, 8, 16, 32, etc.). When an ACL is cached from disk, the file system stores the ACL in the nearest sized cache link equal to or greater than the size of the ACL. For example, if an ACL containing fifteen ACEs is cached from disk, the file system may store the ACL into a cache line corresponding to the cache line class that can hold sixteen ACEs.

Although having multiple cache line classes provides some improvement over cache lines of a single size, difficulty can arise when defining the number of cache lines for each class. In particular, when multiple cache line classes of ACL are defined, the number of cache lines for each class is defined at compilation time. However, due to varying user behavior, classes that have a fewer number of cache lines may be highly utilized, while classes having a higher number of cache lines may be sparsely utilized. These unutilized cache lines account for wasted space in memory.

It is with respect to these and other considerations that the disclosure made herein is presented.

SUMMARY

Technologies are described herein for technologies for caching variably sized ACLs through page object based caching. Instead of allocating memory for specific cache line classes, embodiments described herein allocate memory for page objects, which are chunks of memory. When a user retrieves an ACL from disk, the file system may take a page object from a pre-allocated page object pool and initialize the page object as having a cache line class capable of storing the ACL. The file system may then store the ACL in the page object. In this way, memory is initialized to cache line classes that are most in demand according to user behavior, thereby reducing any wastage of memory resources.

According to one aspect presented herein, technologies are provided for searching for an ACL in memory. A request to access a file is received. An inode number of the requested file is identified. A hash key based on the inode number and a predefined hash value is determined. A determination is made as to whether the hash key is contained in a hash list. In response to determining that the hash key is contained in the hash list, access to a page object in the memory is provided. The page object contains an access control list associated with the requested file. The ACL is then retrieved from the page object.

According to another aspect presented herein, technologies are presented herein for modifying an existing ACL and adding an ACL in memory. A class name is identified based on a number of ACEs in the ACL. The class number is identified in a class list. The class list may include a plurality of class numbers and a plurality of associated pointers coupled to page objects arranged in a doubly linked list. a tail of the doubly linked list may indicate a most recently used page object. A determination is made as to whether a pointer in the class list corresponding to the class number is coupled to the page object. In response to determining that the pointer in the class list corresponding to the class number is coupled to the page object, another determination is made as to whether the page object contains a free ACL slot. In response to determining that the page object contains the free ACL slot, the ACL is inserted into the free ACL slot in the page object. When the ACL is inserted into the free ACL slot in the page object, the page object is moved to the tail of the doubly linked list corresponding to the class number.

In response to determining that the pointer in the class list corresponding to the class number is not coupled to the page object or in response to determining that the page object does not contain the free ACL slot, a new page object is retrieved from a page object pool. The new page object is initialized to the class number. Upon initializing the new page object, the ACL is written to the new page object. Upon writing the ACL to the new page object, the new page object is added to the tail of the doubly linked list.

According to yet another aspect presented herein, technologies are presented herein for reclaiming a page object from memory. An indication is received that the page object pool is empty and no more free ACL slots are available in existing page objects. In response to receiving the indication, one or more of the existing page objects are reclaimed based on a least recently used policy and a predefined usage pattern.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for caching variably sized ACLs through page object based caching, in accordance with some embodiments. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
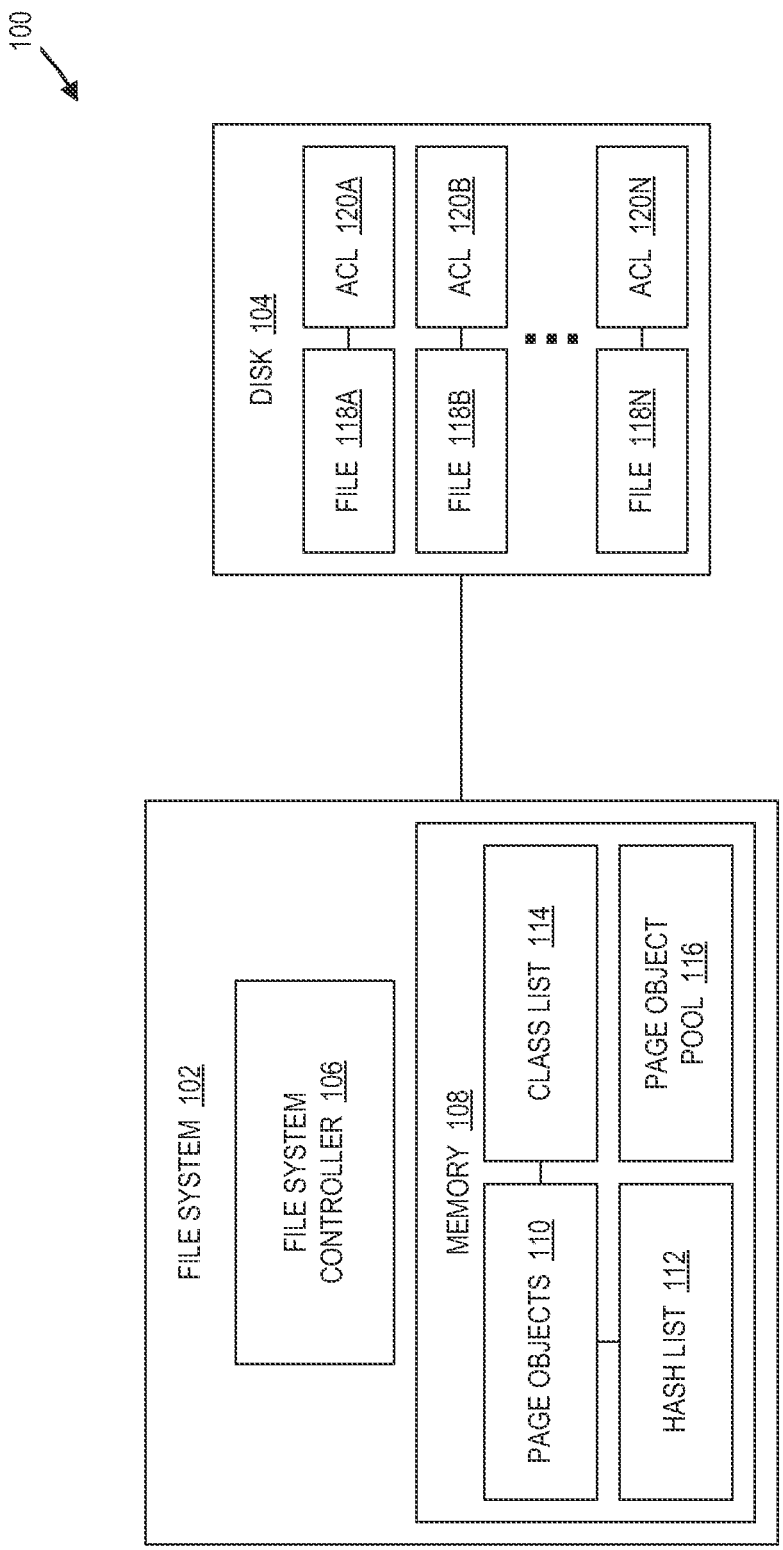
FIG. 1 is a network architecture diagram of a storage replication system configured to cache variably sized access control lists ("ACLs") through page object based caching, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, FIG. 1 shows an illustrative network architecture diagram of a storage system 100 configured to cache variably sized ACLs through page object based caching. The storage system 100 includes a file system 102 coupled to a disk 104. The file system 102 includes a file system controller 106 and a memory 108. The memory 108 includes page objects 110 coupled to a hash list 112 and a class list 114. The memory 108 further includes a page object pool 116. The page objects 110 may be retrieved from the page object pool 116. The disk 104 includes files 118A-118N (collectively referred to as files 118) and associated ACLs 120A-120N (collectively referred to as ACLs 120). Additional details regarding the storage system 100 will be provided below with reference to FIGS. 2-8.

Figure 2:
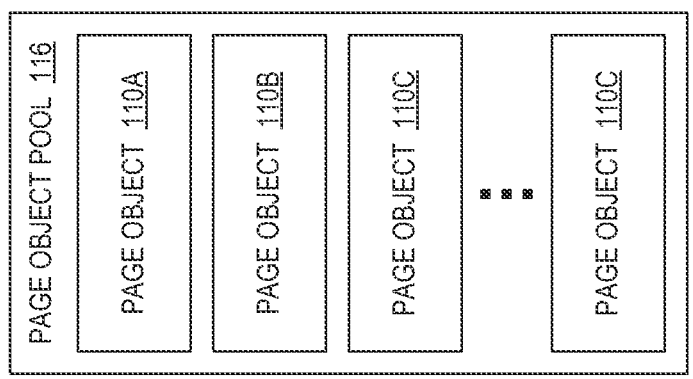
FIG. 2 is a diagram of a page object pool, in accordance with some embodiments.

Referring now to FIG. 2, a diagram of the page object pool 116 is shown. The page object pool 116 includes page objects 110A-110N. Each of the page objects 110A-110N may be a fixed sized. Thus, the number of the ACLs 120 that the page objects 110A-110N can store may depend on the sizes of the ACLs 120. That is, the page objects 110A-110N may store a higher number of smaller ACLs and a lower number of larger ACLs. The page objects 110A-110N may be allocated at compilation time. As described in greater detail below, the file system controller 106 may retrieve one or more of the page objects 110A-110N, such as the page object 110A, and initialize the page object 110A to a cache number class at run time.

Figure 3:
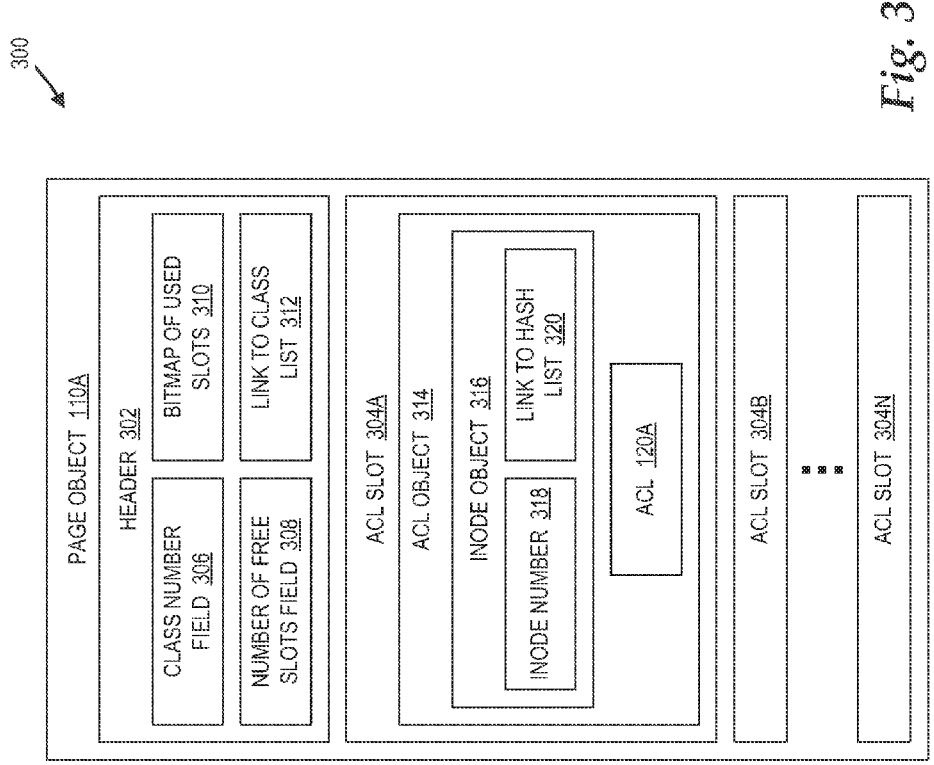
FIG. 3 is a data structure diagram of a page object, in accordance with some embodiments.

Referring now to FIG. 3, a diagram of an illustrative data structure 300 of one the page objects 110, such as the page object 110A, is shown. The data structure 300 includes a header 302 and ACL slots 304A-304N (collectively referred to as ACL slots 304). The header 302 includes a class number field 306, a number of free slots field 308, a bitmap of used slots 310, and a link 312 to the class list 114. The ACL slots 304 may be utilized to store ACL objects, such as ACL object 314. The ACL object 314 includes an inode object 316 and an ACL, such as the ACL 120A. The inode object 316 includes an inode number 318 and a link 320 to the hash list 112.

The class number field 306 may store class numbers of the classes to which the page objects 110 are typecast. The number of free slots field 308 may store the number of the ACL slots 304 that are not occupied by ACL objects, such as the ACL object 314. Each bit in the bitmap of used slots 310 may correspond to one of the ACL slots 304A-304N. For example, a first bit value may indicate that the corresponding ACL slot is occupied, and a second bit value may indicate that the corresponding ACL slot is empty. The bitmap of used slots 310 may be utilized to quickly identify empty slots in the ACL slots 304A-304N.

Figure 4:
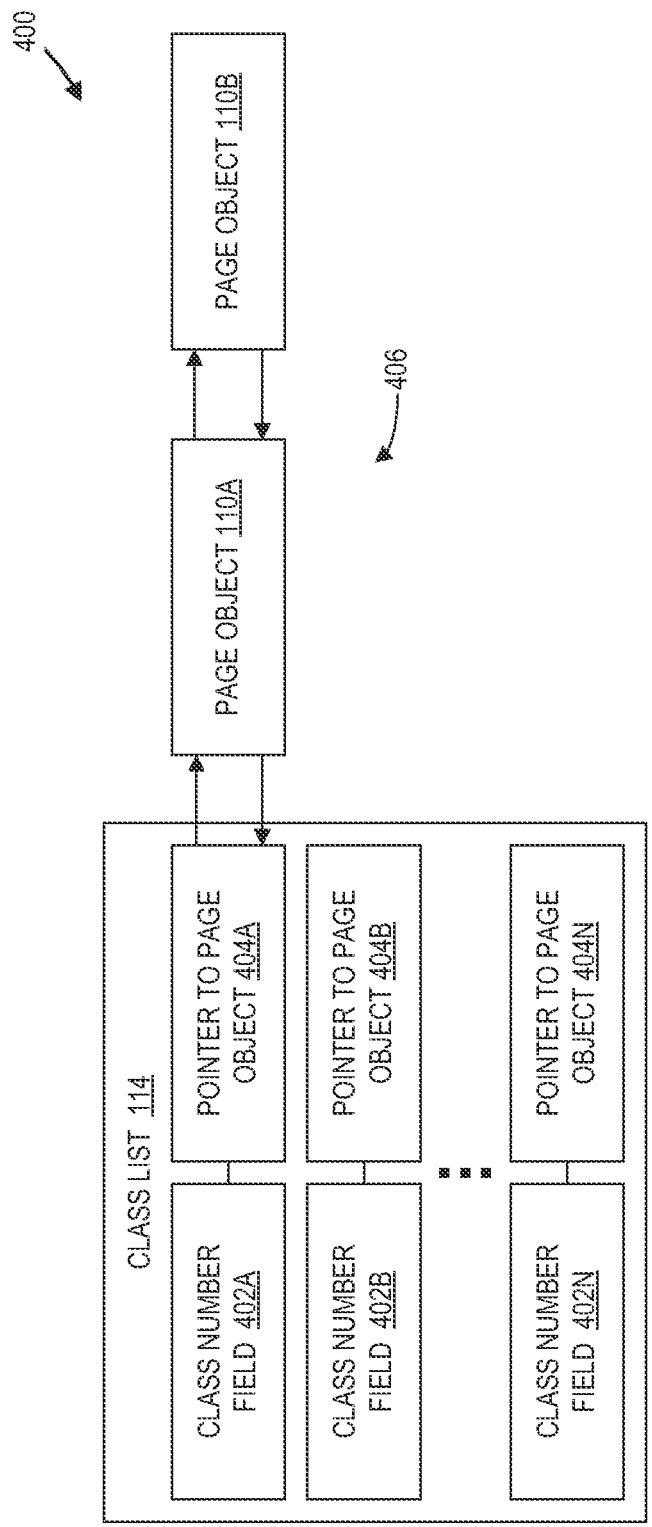
FIG. 4 is a diagram of a class list, in accordance with some embodiments.

Referring now to FIG. 4, a diagram of the class list 114 is shown. The class list 114 includes a plurality of class number fields 402A-402N (collectively referred to as class number fields 402) and a plurality of corresponding pointers 404A-404N (collectively referred to as pointers 404). The class number fields 402 may store class numbers. In some embodiments, the class numbers are specified as powers of two (e.g., 2, 4, 8, 16, 32). When an ACL is cached to the memory 108, the ACL may be assigned the nearest class number equal to or greater than the size of the ACL. For example, if an ACL has two entries, then the ACL is assigned the class number field 402A having a class number of two. If an ACL has 15 entries, then the ACL is assigned to the class number field 402D having a class number of 16.

As described in greater detail below, the file system controller 106 may retrieve one or more of the page objects 110, such as the page object 110A, from the page object pool 116 and initialize the page object 110A to one of the class number fields 402 according to the size of the requested ACL. For example, if the page object 110A corresponds to the class number field 402A, then the corresponding pointer 404A may couple to the page object 110A via the link 312.

According to some embodiments, each of the pointers 404 may be coupled to one or more page objects via a doubly linked list. In this case, the pointer 404 serves as the head of the doubly linked list, and the furthest page object serves as the tail of the doubly linked list. For example, the pointer 404A is coupled to page objects 110A, 110B via a doubly linked list 406. The pointer 404A serves as the head of the doubly linked list 406, and the page object 110B serves as the tail of the double linked list 406. The doubly linked list 406 may be arranged such that the tail of the doubly linked list 406 represents the most recently used page object. The page object nearest to the pointer 404A (i.e., the head of the doubly linked list 406) represents the least recently used page objects. As such, as a page object in the doubly linked list 406 is accessed or added, the page object is moved to the tail of the doubly linked list 406 in order to indicate recent access.

Figure 5:
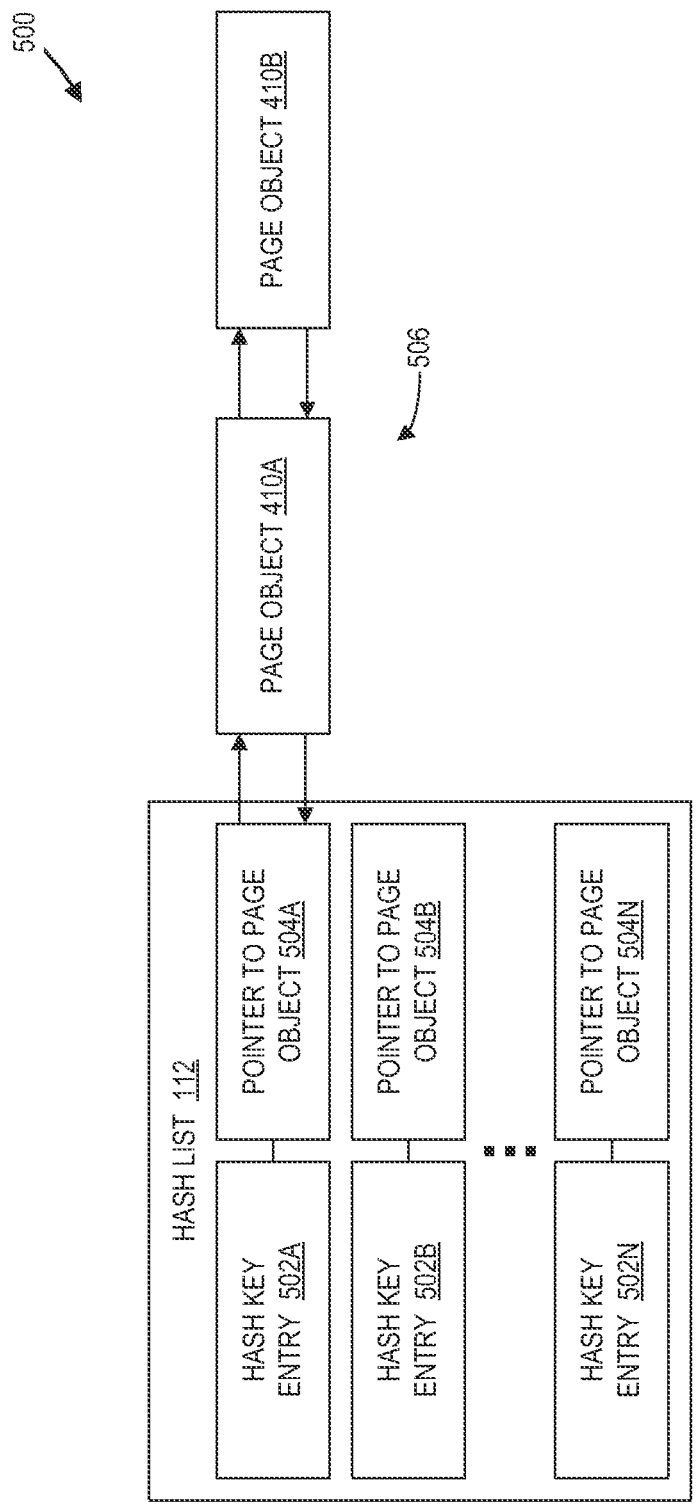
FIG. 5 is a flow diagram showing, in accordance with some embodiments.

Referring now to FIG. 5, a diagram of the hash list 112 is shown. The hash list 112 includes a plurality of hash key entries 502A-502N (collectively referred to as hash key entries 502) and a plurality of corresponding pointers 504A-504N (collectively referred to as pointers 504). The hash key entries 502 may store hash keys corresponding to the inode number 318. For example, a hash key may be obtained by performing a modulo operation on the inode number 318 and a predefined hash number, such as a file system identifier ("FSID"). As described in greater detail below, the file system controller 106 may utilize the hash list 112 to search in the memory 108 for an ACL associated with a file requested by a user. For example, if hash key entry 502A contains a hash key corresponding to a requested file, then the corresponding pointer 504A may direct the file system controller 106 to the corresponding ACL via the link 320. According to some embodiments, each of the pointers 504 may be coupled to one or more page objects via a doubly linked list. For example, the pointer 504 is coupled to page objects 110A, 110B via a doubly linked list 506.

Figure 6:
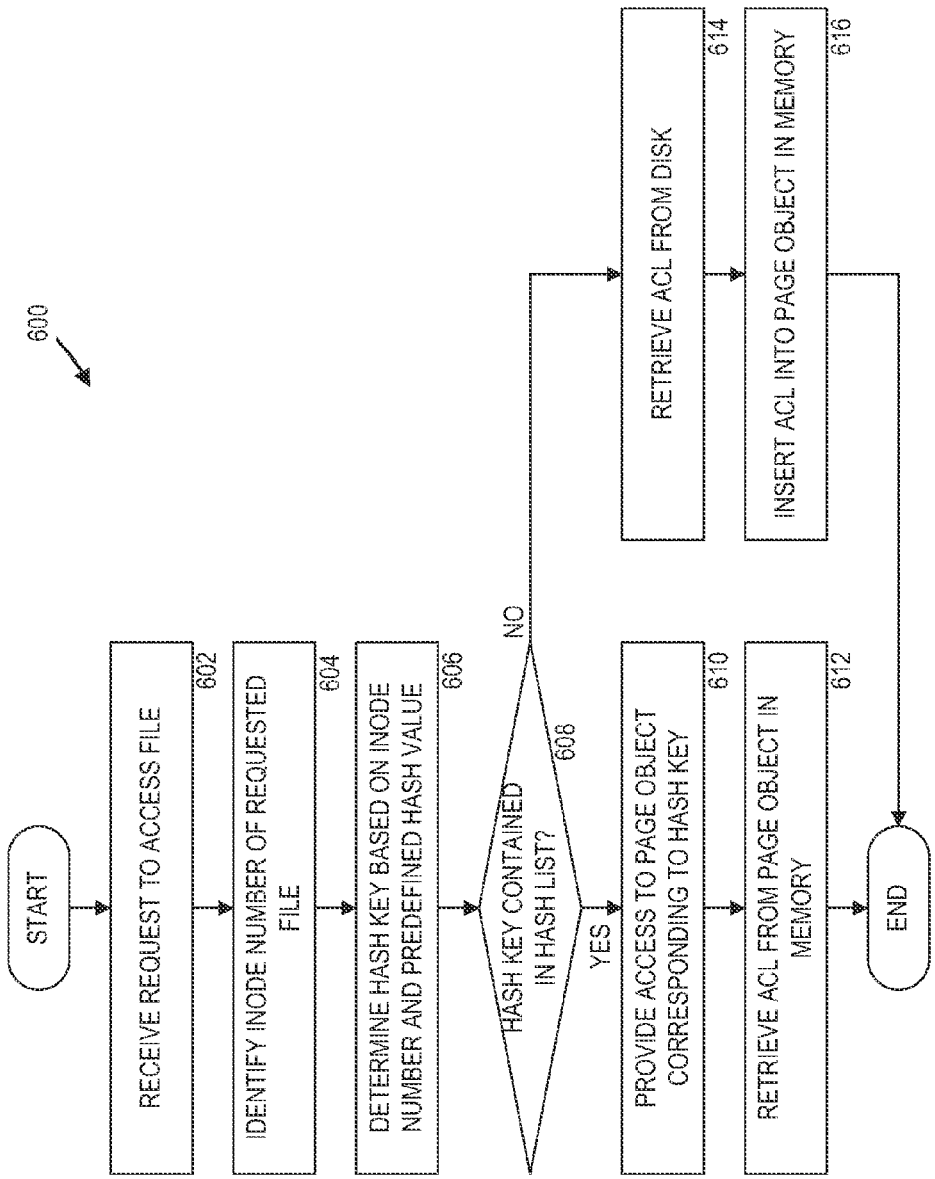
FIG. 6 is a flow diagram showing aspects of a method provided herein for searching for an ACL, in accordance with some embodiments.
Figure 7:
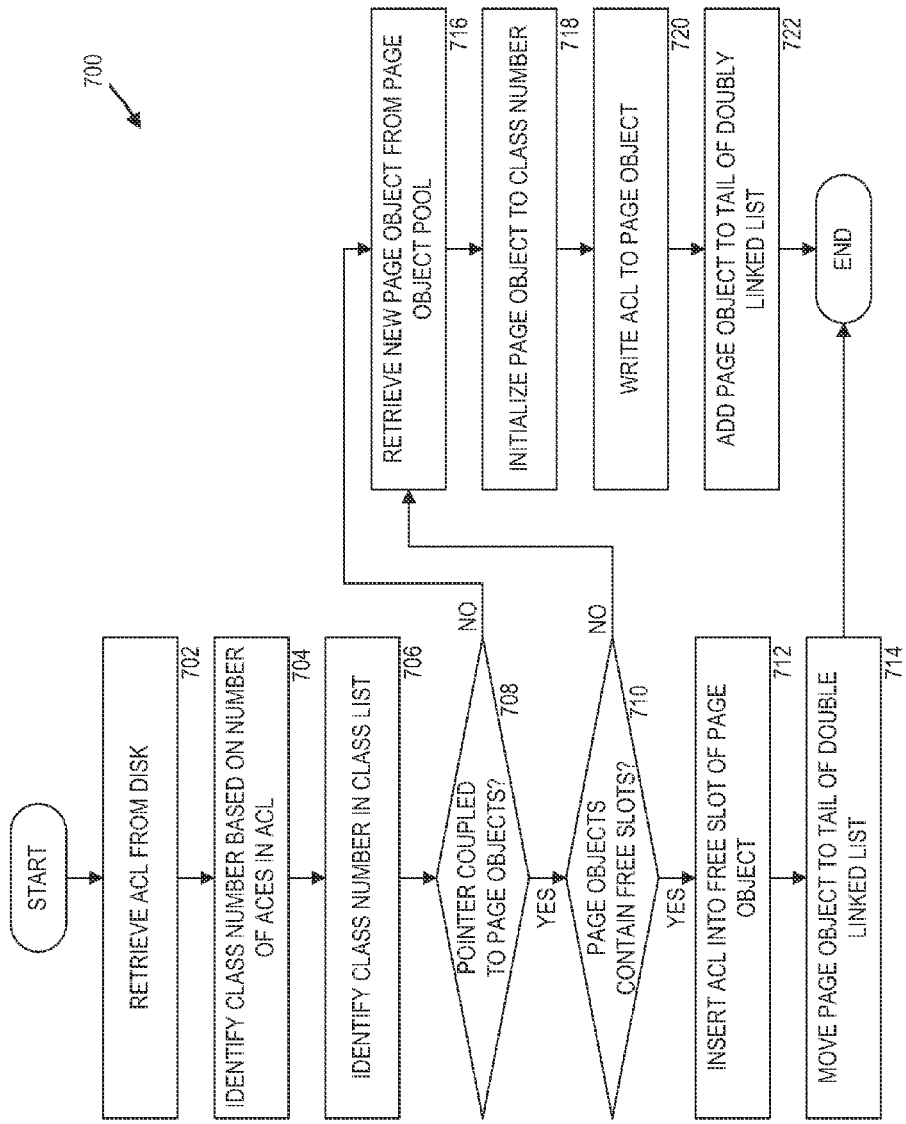
FIG. 7 is a flow diagram showing aspects of a method provided herein for modifying an existing an existing ACL and adding an ACL to the memory, in accordance with some embodiments.
Figure 8:
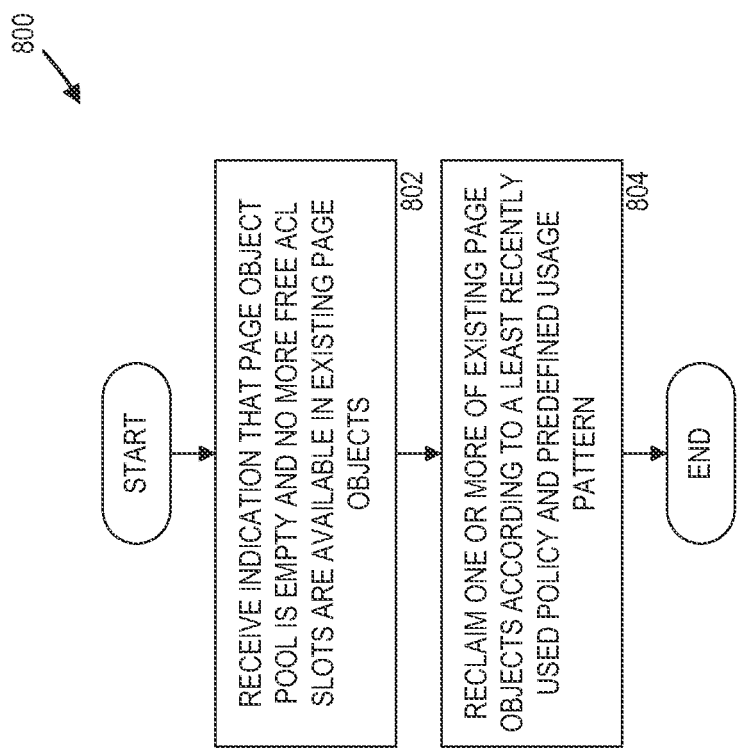
FIG. 8 is a flow diagram showing aspects of a method provided herein for reclaiming a page object from the memory, in accordance with some embodiments.

Referring now to FIGS. 6, 7, and 8, additional details will be provided regarding the operation of the file system controller 106. In particular, FIG. 6 is a flow diagram illustrating aspects of a method provided herein for searching for an ACL. FIG. 7 is a flow diagram illustrating aspects of a method provided herein for modifying an existing ACL and adding an ACL to the memory 108. FIG. 8 is a flow diagram illustrating aspects of a method provided herein for reclaiming a page object from the memory 108. FIGS. 6-8 will be described with reference to FIG. 1-5.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 6, a routine 600 begins at operation 602, where the file system controller 106 receives a request to access one of the files 118, such as the file 118A, in the disk 104. In UNIX/LINUX based file systems, each file system object (e.g. a file, a folder) is associated with an inode, which is a data structure containing, among other data, the ACLs 120. Each inode is uniquely identified by a corresponding inode number, such as the inode number 318, which can be retrieved through standard UNIX/LINUX commands. When the file system controller 106 receives the user request for the file 118A, the routine 600 proceeds to operation 604.

At operation 604, the file system controller 106 identifies the inode number 318 associated with the requested file 118A. The routine 600 then proceeds to operation 606, where the file system controller 106 determines a hash key based on the inode number 318 and a predefined hash number, such as the FSID. When the file system controller 106 determines the hash key, the routine 600 proceeds to operation 608.

At operation 608, the routine 600 determines whether the hash key is contained in hash list 112. In particular, if the hash key is found in one of the hash key entries 502, such as the hash key entry 502A, then the routine 600 proceeds to operation 610, where the corresponding pointer 504A may direct the file system controller 106 to the page object 110A via the link 320. At operation 612, the file system controller 106 may then retrieve the ACL 120A from the page object 110A.

If the hash key is not found in one of the hash key entries 502, then the routine 600 proceeds to operation 614, where the file system controller 106 retrieves the ACL 120A from the disk 104. At operation 616, the file system controller 106 then adds the ACL 120A to one of the page objects 110. An example of the operation 616 is described in routine 700. The routine 700 terminates after operations 612 and 616.

Referring to FIG. 7, a routine 700 begins at operation 702, where the file system controller 106 retrieves an ACL, such as the ACL 120A from the disk 104. The routine 700 then proceeds to operation 704, where the file system controller 106 identifies as class number based on the number of ACEs in the ACL 120A. As previously described, class numbers may be specified as powers of two. The file system controller 106 may select the nearest power of two that is equal to or greater than the number of ACEs in the ACL 120A. In an illustrative example, the ACL 120A has two entries, and is therefore assigned a class number of two. When the file system controller 106 identifies the class number for the ACL 120A, the routine 700 proceeds to operation 706.

At operation 706, the file system controller 106 identifies the class number in one of the class number fields 402 of the class list 114. In this example, the class number field 402A contains the class number of two. The routine 700 then proceeds to operation 708, where the file system controller 106 determines whether the pointer 404A corresponding to the class number field 402A is coupled to any page objects, such as the page objects 110A, 110B.

If the pointer 404A is coupled to page objects, such as the page objects 410A, 410B, then the routine 700 proceeds to operation 710, where the file system controller 106 determines whether the page objects 110A, 110B have any free ACL slots. For example, the file system controller 106 may read the number of free slots field 308. If the number of free slots field 308 contains a number greater than zero, then the file system controller 106 may identify the free ACL slots based on the bitmap of used slots 310.

If the page objects 110A, 110B have a free ACL slot, then the routine 700 proceeds to operation 712, where the file system controller 106 inserts the ACL 120A into the free ACL slot. The file system controller 106 may also modify the number of free slots field 308 and the bitmap of used slots 310 to account for the insertion of the ACL 120A into the free ACL slot. The routine 700 then proceeds to operation 714, where the file system controller 106 moves the corresponding page object storing the ACL 120A to the tail of the doubly linked list 406, thereby indicating that the corresponding page object was most recently used.

If the page objects 110A, 110B do not have any free slots or if the pointer 404A is not coupled to any page objects, then the routine 700 proceeds to operation 716, where the file system controller 106 retrieves a new, uninitialized page object, such as the page object 110C from the page object pool 116. The routine 700 then proceeds to operation 718, where the file system controller 106 initializes the page object 110C to the class number of two, which corresponds to the ACL 120A. This may also be referred to as "typecasting" the page object 110C. For example, during the initialization process, the file system controller 106 may write the class number of two into the class number field 306 and allocate a number of the ACL slots 304 corresponding to the class number. At operations 720 and 722, the file system controller 106 writes the ACL 120A into one of the ACL slots 304 in the page object 110C and adds the page object 110C to the tail of the doubly linked list 406, thereby indicating that the page object 110C was most recently used. The routine 700 terminates after operations 714 and 722.

Referring to FIG. 8, a routine 800 begins at operation 802, where the file system controller 106 receives an indication that the page object pool 116 is empty and no more free ACL slots are available in the page objects 110 that are initialized and coupled to the class list 114. The routine 800 then proceeds to operation 804, where the file system controller 106 reclaims one or more of the page objects 110 from the memory 108, thereby inserting these page objects back into the page object pool 116. The routine 800 terminates after operation 804.

In some embodiments, the file system controller 106 may reclaim page objects according to a reclaim policy. The reclaim policy may identify page objects to claim based on both a least recently used ("LRU") policy as well as a predefined usage pattern. As previously described, the page objects that are least recently used are near the head of the doubly linked lists. In this case, the page objects are the nearest to the head of the double linked lists have a greater likelihood of being reclaimed.

Further, in some embodiments, a fair distribution requirement may be hard-coded into the file system controller 106. The fair distribution requirement may pre-assign a number of page objects to each class number according to an anticipated usage pattern. For example, if the class number of eight is anticipated to have greater usage than the class number of four, then the class number of eight may be pre-assigned a greater number of page objects than the class number of four. In this case, if the number of actual page objects coupled to a given pointer in the pointers 404 is greater than the anticipated number in the fair distribution requirement, then the least recently used page objects coupled to the given pointer have a greater likelihood of being reclaimed.

Figure 9:
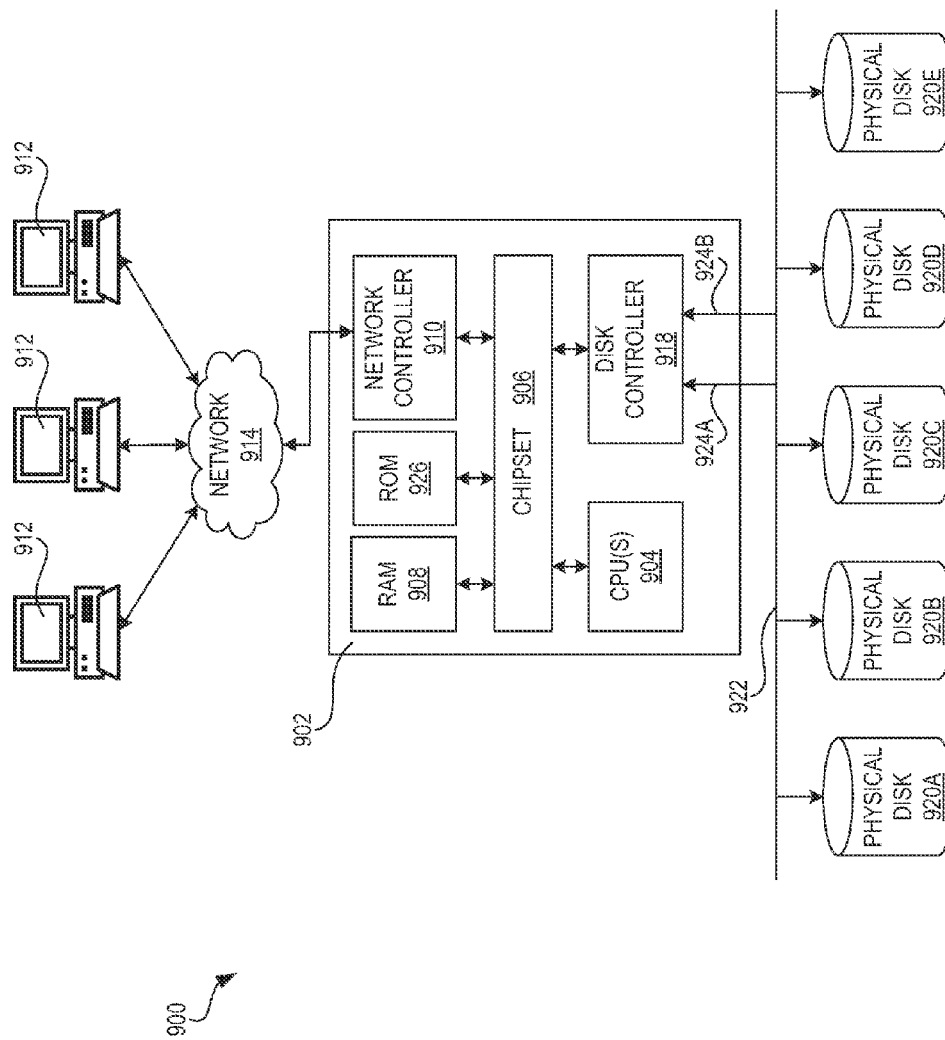
FIG. 9 is a computer architecture diagram showing aspects of an illustrative computer hardware architecture for a computing system capable of implementing aspects of the embodiments presented herein.

FIG. 9 and the following discussion are intended to provide a brief, general description of a suitable computing environment in which the embodiments described herein may be implemented. In particular, FIG. 9 shows an exemplary storage system 900 including a storage computer, or storage controller 902. The storage controller 902 includes the file system controller 106. The storage controller 902 includes a baseboard, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 are standard programmable processors that perform arithmetic and logical operations necessary for the operation of the storage controller 902.

The CPUs 904 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the storage controller 902. The chipset 906 also provides an interface to a random access memory ("RAM") 908 used as the main memory in the storage controller 902. The chipset 906 also includes functionality for providing network connectivity through a network controller 910, such as a gigabit Ethernet adapter. The network controller 910 is capable of connecting the storage controllers 902A, 902B to each other as well as to other client computers 912 acting as initiators of I/O operations over a network 914. The network 914 may be an Ethernet or Gigabyte Ethernet LAN, a fiber ring, a fiber star, wireless, optical, satellite, a WAN, a MAN, or any other network technology, topology, protocol, or combination thereof.

According to embodiments, the storage controller 902 is connected to a number of physical storage devices, such as physical disks 920A-920E (also referred to herein as physical disks 920) shown in FIG. 9. The physical disks 920 provide the data storage capacity required for the storage controller 902 to store data and service I/O operations initiated by the client computers 912 over the network 914. A disk controller 918 allows the storage controller 902 to communicate with the physical disks 920 connected to the storage controller. According to one embodiment, the disk controller 918 may interface with the physical disks 920 through a serial attached SCSI ("SAS") interface. In other embodiments, the disk controller 918 may interface with the physical disks 920 utilizing a serial advanced technology attachment ("SATA") interface, a fiber channel ("FC") interface, or other standard interface for physically connecting and transferring data between computers and physical storage devices.

According to embodiments, the physical disks 920 may be connected to the storage controller 902 through a bus 922 that allows the disk controller 918 to communicate with the disks. In one embodiment, the physical and electrical structure of the bus 922 may be based upon the storage bridge bay ("SBB") specification. The SBB specification defines mechanical, electrical, and low-level enclosure management requirements for a single enclosure that supports the connection of multiple storage controllers 902 as well as multiple physical disks 920 from a variety of hardware and system vendors. The SBB mid-plane provides the bus 922 that allows multiple storage controller 902 to be connected to and communicate with the physical disks 920 concurrently. According to embodiments, the disk controller 918 is capable of utilizing multiple point-to-point communication channels, or ports 924A, 924B, to communicate with other devices over the SBB bus 922. For example, the disk controller 918 may utilize one or more ports 924A to communicate with each physical disk 920 across the bus 922, while utilizing a separate port 924B to communicate across the bus with another storage controller 902.

The storage controller 902 may store data on the physical disks 920 by transforming the physical state of the disks to reflect the information being stored. The specific transformation of physical state may depend on various factors, in different implementations of this description. Examples of such factors may include, but are not limited to, the technology used to implement the physical disks 920, whether the physical disks are characterized as primary or secondary storage, and the like. For example, the storage controller 902 may store data to the physical disks 920 by issuing instructions to the disk controller 918 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The storage controller 902 may further read information from the physical disks 920 by detecting the physical states or characteristics of one or more particular locations within the devices.

In addition to the physical disks 920 described above, the storage controller 902 may have access to other computer-readable storage medium to store and retrieve information, such as program modules, data structures, or other data. It should be appreciated by those skilled in the art that computer-readable storage media can be any available media that can be accessed by the storage controller 902. By way of example, and not limitation, computer-readable storage media may include volatile and non-volatile, removable and non-removable media implemented in any method or technology. Computer-readable storage media includes, but is not limited to, RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the storage controller 902.

The computer-readable storage media may store an operating system (not shown) utilized to control the operation of the storage controller 902. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The computer-readable storage media may store other system or application programs and data utilized by the storage controller 902. In one embodiment, the computer-readable storage medium may be encoded with computer-executable instructions that, when loaded into the storage controller 902, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the storage controller 902 by specifying how the CPUs 904 transitions between states, as described above. According to one embodiment, the storage controller 902 may have access to computer-readable storage media storing computer-executable instructions that, when executed by the computer system, perform the routines for providing page object caching for variably sized ACLs, as described in greater detail above with reference to FIGS. 1-8.

The chipset 906 may also provide an interface to a computer-readable storage medium such as a ROM 926 or NVRAM for storing a firmware that includes program code containing the basic routines that help to startup the storage controller 902 and to transfer information between elements within the storage controller. The ROM 924 or NVRAM may also store other software components necessary for the operation of the storage controller 902 in accordance with the embodiments described herein. It will be appreciated that the storage controller 902 might not include all of the components shown in FIG. 9, may include other components that are not explicitly shown in FIG. 9, or may utilize an architecture completely different than that shown in FIG. 9.

Based on the foregoing, it should be appreciated that technologies for providing page object caching for variably sized ACLs are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for caching variably sized access control lists (ACLs) in a data storage system having a memory and a disk, the computer-implemented method comprising computer-implemented operations for:
  receiving a request to access a file;
  identifying an inode number of the requested file;
  determining a hash key based on the inode number and a predefined hash value;
  determining whether the hash key is contained in a hash list;
  in response to determining that the hash key is contained in the hash list, providing access to a page object in the memory, the page object storing a plurality of access control lists (ACLs) including an ACL associated with the requested file; and
  retrieving the ACL associated with the requested file from the page object.

2. The computer-implemented method of claim 1, wherein determining a hash key based on the inode number and a predefined hash value comprises determining the hash key by performing a modulo operation on the inode number and the predefined hash value.

3. The computer-implemented method of claim 1, wherein the hash list comprises a plurality of hash keys and a plurality of associated pointers coupled to page objects; wherein providing access to a page object in the memory comprises providing access to the page object in the memory via a pointer associated with the hash key in the hash list.

4. A data storage system, comprising:
  a disk configured to store a plurality of files and a plurality of associated variably sized access control lists (ACLs);
  a memory configured to store page objects, the page objects configured to store the ACLs;
  a hash list comprising a plurality of hash keys and a plurality of associated pointers coupled to the page objects;
  a class list comprising a plurality of class numbers and a plurality of associated pointers coupled to the page objects arranged in a doubly linked list, a tail of the doubly linked list indicating a most recently used page object;
  a page object pool comprising one or more new page objects allocated in the memory at compilation time; and
  a file system controller configured to cache the ACLs by
    receiving a request to access a file,
    identifying an inode number of the requested file,
    determining a hash key based on the inode number and a predefined hash value,
    determining whether the hash key is contained in the hash list,
    in response to determining that the hash key is contained in the hash list, providing access to a page object in the memory, the page object storing a plurality of ACLs including an ACL associated with the requested file; and
    retrieving the ACL associated with the requested file from the page object.

5. The data storage system of claim 4, wherein the predefined hash value comprises a file system identifier (FSID); and wherein determining a hash key based on the inode number and a predefined hash value comprises determining the hash key by performing a modulo operation on the inode number and the FSID.

6. The data storage system of claim 4, wherein the hash list comprises a plurality of hash keys and a plurality of associated pointers coupled to page objects; wherein providing access to a page object in the memory comprises providing access to the page object in the memory via a pointer associated with the hash key in the hash list.

7. A non-transitory computer-readable storage medium having computer-executable instructions stored thereon which, when executed by a computer, cause the computer to:
  receive a request to access a file;
  identify an inode number of the requested file;
  determine a hash key based on the inode number and a predefined hash value;
  determine whether the hash key is contained in a hash list;
  in response to determining that the hash key is contained in the hash list, provide access to a page object in the memory, the page object storing a plurality of access control lists (ACLs) including an ACL associated with the requested file; and
  retrieve the ACL associated with the requested file from the page object.

8. The non-transitory computer-readable storage medium of claim 7, wherein determining a hash key based on the inode number and a predefined hash value comprises determining the hash key by performing a modulo operation on the inode number and the predefined hash value.

9. The non-transitory computer-readable storage medium of claim 7, wherein the hash list comprises a plurality of hash keys and a plurality of associated pointers coupled to page objects; wherein providing access to a page object in the memory comprises providing access to the page object in the memory via a pointer associated with the hash key in the hash list.

* * * * *